United States Patent [19]

Pickard et al.

[11] Patent Number: 5,355,869

[45] Date of Patent: Oct. 18, 1994

[54] SELF-HEATING GROUP MEAL ASSEMBLY AND METHOD OF USING SAME

[75] Inventors: Donald W. Pickard, Sherborn; Robert L. Trottier, Franklin, both of Mass.; Peter G. Lavigne, Cumberland, Me.

[73] Assignee: The United States of America as represented by the Secretary of the Army, Washington, D.C.

[21] Appl. No.: 196,537

[22] Filed: Feb. 15, 1994

[51] Int. Cl.$^5$ ............................................. F24J 1/00
[52] U.S. Cl. ............................... 126/263 R; 126/246; 426/407; 426/113
[58] Field of Search ............... 126/263, 206, 246, 261, 126/262; 206/222, 216, 266, 204; 426/109, 113, 114, 407

[56] References Cited

U.S. PATENT DOCUMENTS

| | | | |
|---|---|---|---|
| 4,510,919 | 4/1985 | Benmussa | 126/263 |
| 4,522,190 | 6/1985 | Kuhn et al. | 126/263 |
| 4,559,921 | 12/1985 | Benmussa | 126/263 |
| 4,762,113 | 8/1988 | Hamasaki | 126/263 |
| 4,771,761 | 9/1988 | Doukhan et al. | 126/263 |
| 4,809,673 | 3/1989 | Charvin | 126/263 |
| 5,117,809 | 6/1992 | Scaringe et al. | 126/263 |
| 5,220,909 | 6/1993 | Pickard et al. | 126/263 |

OTHER PUBLICATIONS

Pickard et al., "Innovative Concepts for Self-Heating Meals," Activities Report and Minutes of Work Groups & Sub-Work Groups of the R&D Associates, vol. 44, No. 1, pp. 35–39 (May 1992) published by the Research and Development Associates for Military Food and Packaging Systems, Inc., San Antonio, Tex.

*Primary Examiner*—James C. Yeung
*Attorney, Agent, or Firm*—Richard J. Donahue

[57] ABSTRACT

A self-heating group meal assembly and method of using same. In one embodiment, the assembly comprises a plurality of heating trays, each heating tray having a plurality of standoffs extending upwardly from the bottom thereof. The assembly also comprises a corresponding plurality of heater assemblies, each heater assembly being positioned within a tray on top of the standoffs so as to define a reservoir between itself and the bottom of its tray. Each heater assembly comprises a sturdy polymeric sheet of material shaped to define a plurality of pockets, an exothermic chemical heater material packaged into each of the pockets and a sheet of porous non-woven scrim attached to the bottom surface of the polymeric sheet and used to seal the pockets. The exothermic chemical heater material comprises a Mg-Fe alloy from which all activating electrolytes have been omitted to prevent inadvertent activation of the alloy in the event of water immersion. The assembly also comprises a corresponding plurality of institutional-size food pouches, each food pouch being placed directly on top of a heater assembly. A metering tube section is removably mounted in each tray, each tube section having an orifice aligned with its corresponding reservoir to provide activating solution thereto. The metering tube sections are separably connected to one another and are removably connectable to a collapsible activating solution container. A mixture of activating electrolytes and other ingredients are stored in the container. Just prior to use, water is added to the mixture of ingredients in the container, and the container is attached to the metering tube sections to permit the solution to be dispensed thereinto.

18 Claims, 5 Drawing Sheets

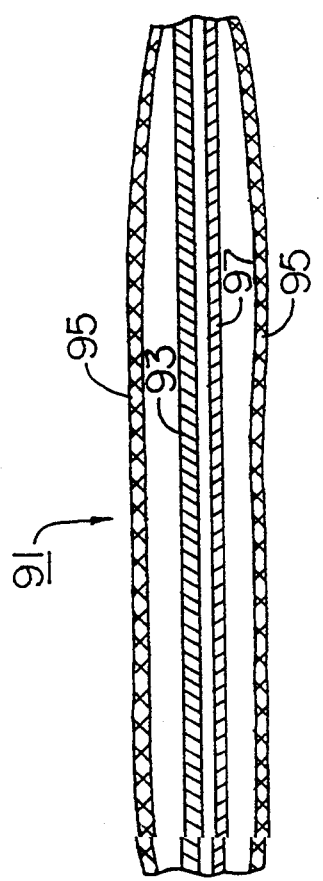
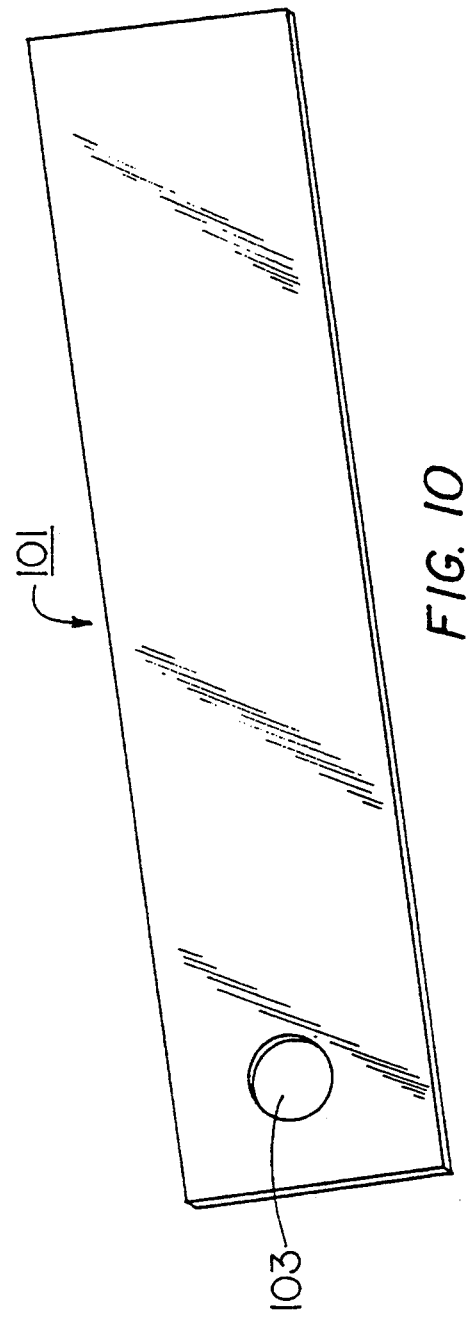

SELF-HEATING GROUP MEAL ASSEMBLY AND METHOD OF USING SAME

The invention described herein may be manufactured, used and licensed by or for the Government for Governmental purposes without the payment to us of any royalty thereon.

BACKGROUND OF THE INVENTION

The present invention relates generally to self-heating meal assemblies and more particularly to a novel self-heating group meal assembly.

Self-heating meal assemblies of the type used, for example, by the military to heat rations of food for an individual are well-known.

One example of a self-heating meal assembly designed for use for an individual is described in commonly-assigned U.S. Pat. No. 5,220,909, which issued Jun. 22, 1993, with inventors Pickard et al. In this patent, there is disclosed a self-heating individual meal assembly (also referred to as a "self-heating individual meal module") which includes a tub for holding a quantity of food to be heated. Below the tub is a tray containing an electrolytic-solution-activatable exothermic-chemical pad and a pouch containing an electrolytic solution. The tub is welded to the tray and is in contact with the pad. A pull-tab is attached to the pouch for opening the pouch so that the electrolytic solution inside the pouch can flow out to trigger the exothermic reaction in the pad so as to heat the tub containing the food. The tub and the tray are removably seated in a first paperboard carton which provides protection during storage and transportation and insulation during the heating process. The self-heating individual meal module may also include a second paperboard carton having removably seated inside a quantity of shelf-stable bread, a beverage powder, a dessert, accessories and eating utensils. The two paperboard cartons may be glued together to provide a complete single serve meal.

Another such self-heating meal assembly is described in U.S. Pat. No. 4,559,921, which issued Dec. 24, 1985, with inventor Benmussa. In this patent, there is disclosed a self-heating receptacle comprising a vessel for food to be heated, and below the vessel a sealed container containing two chemicals, e.g. quick lime and water. A sealed pouch within the container prevents one of the chemicals from contacting the other. A tearing filament secured to the pouch simultaneously opens the pouch and the container thereby triggering the exothermic reaction to heat said food vessel. The pouch is suspended by its ends above the bottom of the container and is surrounded by said other chemical. There is an outer housing in the bottom of which the container is disposed, the food vessel being disposed in the top of this housing. The container is hermetically sealed with a lid. The tearing filament extends across the lid below the bottom of the food vessel and emerges from between the housing and the food vessel in a portion that can be grasped by the user to pull on the tearing filament thereby both to open the pouch and to tear the lid.

While the above-described self-heating meal assemblies are generally well-suited for heating individual meal rations, they are not as well-suited for heating group meal rations, which are typically 12–36 times larger than individual meal rations. This is in large part due to the bulk of heating materials necessary to heat such large quantities of food. For example, measurements have shown that the heater to food weight ratio is typically 1:1 for packages utilizing quick lime as the solvent-actuable heating element and 1:8 for packages utilizing Mg-Fe as the solvent-actuable heating element. Consequently, to heat 26 pounds of food, one would typically require 26 pounds of quick lime or 3.5 pounds of Mg-Fe in addition to other packaging weights. These weights may be contrasted to current catering methods which use chafing trays and only a few ounces of a gelled alcohol.

Self-heating meal assemblies of the type described above also often encounter problems of shelf stability. More specifically, self-heating packages that use quick lime are known to slowly deactivate over time due to the hydroscopic nature of the material. Consequently, expensive steps, such as moisture barrier packaging, are often taken to hermetically contain the heater. Nevertheless, such techniques are not foolproof, and some moisture may still leak around necessary protuberances, such as pull tabs. Similarly, Mg-Fe heaters are typically packaged with salts and surfactants necessary for the heater to work, but these additives attract moisture and can slowly deactivate the heaters. More importantly, the safe transportation and storage of Mg-Fe heaters is problematic since the accidental water immersion of bulk packages could cause the heaters to react releasing flammable hydrogen gas.

Notwithstanding the above, there are many situations in which self-heating group-sized meal assemblies would be useful. For example, in military applications, it would be highly desirable to serve a meal to a large group without needing burners, fuel, heater cabinets or insulated carriers. In addition, there are also civilian applications including catering or meal service at group functions, particularly where fire codes do not permit open flames. Moreover, there are civilian applications for contingency operations in remote areas such as fire fighting or for disaster relief where there is no available food equipment or electric power.

In "Innovative Concepts for Self-Heating Meals," *Activities Report and Minutes of Work Groups & Sub-Work Groups of the R&D Associates,* Vol. 44, No. 1, pp. 35–39 (1992), published by the RESEARCH and DEVELOPMENT ASSOCIATES for MILITARY FOOD and PACKAGING SYSTEMS, INC., San Antonio, Tex., Pickard et al. describe the following concept for a Self-Heating Group Meal (SHGM): "The SHGM is an adaptation of the current institutional pouch. This pouch is constructed of a trilaminate similar to a Meal Ready to Eat (MRE) entree pouch. The institutional pouch typically holds 6.6 pounds of thermostabilized food, similar to a tray pack. This pouch is an excellent choice for chemical heating, because the packaging conducts heat well, the food cross-section is relatively thin, and there is no head space, so the pouch can be effectively heated on both sides.

"A polypropylene heating/serving tray has been configured for the pouch. The bottom of the tray holds six 30-gram heaters that require 12 oz. of water to activate. A typical meal would consist of a stack of four pouches and trays. Water is poured into a fold-out reservoir above the trays and is evenly distributed to the four trays through a tube. To conserve energy, the bottom tray sits on an insulating pad, and the entire meal is packaged in a plastic-lined, corrugated fiberboard box.

"To activate the SHGM, the box is opened exposing the reservoir. One canteen of water is poured into the reservoir and the box is re-closed. Preliminary testing has yielded remarkable time/temperature profiles that indicate this ration will heat-up the requisite 100° F. from 40° F. to 140° F. in less than 30 minutes and will stay hot for 6 hours or more. Tests show that 6.6 pounds of water were heated from 50° F. to 160° F. in only 15 minutes.

"Because the SHGM is made from polymeric materials, the final package is expected to be very compact, light, and inexpensive. Reheating time and temperature can be controlled by design instead of by instruction. For example, a heater tray designed for chicken stew may have six 30 g pads. With regard to battlefield disposal, the polymeric materials can be burned or compacted to a small volume. The self-heating serving tray will also continue to keep the meal warm until the last soldier is served. Best of all, the pouches do not require can openers.

"Bulk packaging has been another consideration in the design. Cases (10×12×15 inches) will yield three levels of 16 cases on a standard 40×48 inch pallet. If the levels are designated for breakfast, lunch and dinner, a pallet will feed various sized groups from 18 soldiers for 16 days, to 288 soldiers for 1 day, which simplifies the logistics of field feeding."

One shortcoming that has been identified by the present inventors with the above-described self-heating group meal concept is the water delivery system comprising the fold-out reservoir and the single piece of continuous tubing connected thereto for delivery of water to the four heating trays. The present inventors have found the fold-out reservoir to be cumbersome and hard to use. In addition, the present inventors have found the single piece of tubing to be difficult to use since the tubing has to be positioned relative to the four trays so that four water outlet holes formed in the tubing are correspondingly aligned with the four trays. Moreover, because the single piece of tubing physically interconnects the four trays, one must cut the tubing between each pair of adjacent trays if one wishes to gain access to the contents of the lower tray of each pair.

SUMMARY OF THE INVENTION

It is an object of the present invention to provide a new self-heating group meal assembly.

It is another object of the present invention to provide a self-heating group meal assembly as described above which overcomes at least some of the shortcomings associated with the self-heating group meal concept previously described.

It is still another object of the present invention to provide a self-heating group meal assembly as described above which does not require hermetic seals, moisture barrier packaging or other special means to ensure stability of its heater element, even under high humidity conditions.

It is still yet another object of the present invention to provide a self-heating group meal assembly as described above that has a heater to food weight ratio superior to the 1:1 ratio for most quick lime packages and the 1:8 ratio for most Mg-Fe packages.

It is still yet a further object of the present invention to provide a self-heating group meal assembly as described above that does not use an open flame, that can be actuated while traveling, for example, to a social function, that can keep food warm for a prolonged period of time, and that is not dependent on equipment capacities or the use of electrical power.

Additional objects, as well as features and advantages thereof, will be set forth in part in the description which follows, and in part will be obvious from the description or may be learned by practice of the invention. The objects of the invention also may be realized and attained by means of instrumentalities and combinations particularly pointed out in the appended claims.

In furtherance of the above and other objects of the present invention, a self-heating group meal assembly is provided herein, the self-heating group meal assembly comprising in one embodiment:

(a) a first tray, said first tray having a first plurality of standoffs extending upwardly from the bottom thereof;

(b) a first heater assembly, said first heater assembly comprising (i) an exothermic chemical heater, said exothermic chemical heater being a Mg-Fe alloy heater from which all water soluble activating electrolytes have been omitted and (ii) packaging means for containing said exothermic chemical heater, said packaging means comprising a bottom portion made of a porous material through which an electrolyte-containing activator fluid may pass and a top portion made of a material through which heat may be conducted for heating a group-sized quantity of food positioned thereon, said first heater assembly being seated within said first tray with said bottom portion of porous material positioned on top of said first plurality of standoffs so as to define a first reservoir between said porous material and the bottom of said first tray;

(c) a first food container for holding a group-sized quantity of food, said first food container being made of a heat-conductive material and being positioned on top of said first heater assembly;

(d) a second tray positioned over said first food container, said second tray having a second plurality of standoffs extending upwardly from the bottom thereof;

(e) a second heater assembly, said second heater assembly being identical to said first heater assembly and being seated within said second tray with its bottom portion of porous material positioned on top of said second plurality of standoffs so as to define a second reservoir between said porous material and the bottom of said second tray;

(f) a second food container for holding a group-sized quantity of food, said second food container being made of a heat-conductive material and being positioned on top of said second heater assembly;

(g) a pair of separably interconnected tube sections, the first of said pair being mounted on said first tray and having an orifice alignable with said first reservoir, the second of said pair being mounted on said second tray and having an orifice alignable with said second reservoir; and (h) a container connectable to said pair of separably interconnected tube sections, said container holding an appropriate quantity of dry activating electrolytes suitable for making an electrolyte-containing activator fluid upon the addition of water thereto.

Because the exothermic chemical heater of the invention described above is an Mg-Fe alloy heater from which all water soluble activating electrolytes have been omitted, the heater has improved shelf stability and is much less likely to be accidentally activated in the event of water immersion.

The activator fluid is prepared immediately before use by adding an appropriate amount of water to a mixture of activating electrolytes, surfactants, antifreeze and other ingredients (e.g., a hydrogen suppression material) stored inside the activator fluid container. Preferably, the activator fluid container is only connected to the interconnected tube sections after the quantity of water has been added thereto and immediately before use to minimize the risk of inadvertent activation or deterioration due to high humidity. The activator fluid container is preferably collapsible in construction so that, prior to adding the quantity of water thereto, the container can be stored easily in a small space.

Preferably, the self-heating group meal assembly of the present invention additionally includes third and fourth trays, third and fourth heater assemblies, third and fourth food containers, and third and fourth interconnectable tube sections, all of which are sequentially arranged on top of the above-described components in the same manner as described above. In this way, for example, an entree can be heated in the first food container, a vegetable can be heated in the second food container, a starch can be heated in the third food container, and a dessert can be heated in the fourth food container. If desired, the self-heating group meal assembly could further include a fifth tray, fifth heater assembly, fifth food container and fifth interconnectable tube section so that, for example, a pouch or tray filled with water and configured with a spout could be used to provide hot water for soups or beverages.

Preferably, the food containers are institutional-size (6.6 pound) pouches of a conventional high barrier multi-laminate material. The pouches may be filled with pumpable foods, such as stews, casseroles, vegetables or noodles. Alternatively, half-sized institutional size pouches, form/fill/seal pouches or polymeric or metal trays all constructed of heat-conductive materials could be used for items like hamburgers, chicken breasts or lasagna.

The self-heating group meal assembly of the present invention preferably further includes an open-bottomed corrugated fiberboard box, said box defining a heating compartment in which the entirety of the above-described components are kept, both during storage and heating. Heat-insulative materials, such as styrofoam pads, are preferably placed inside the heating compartment, both under the bottom tray and on top of the top food container. To prevent a loss of moisture from the heater assemblies into the styrofoam pads, the trays, heater assemblies and food containers may be surrounded by a plastic containment bag employed within the heating compartment.

The entire self-heating group meal assembly may be packed in a corrugated or solid fiberboard shipping container with, for example, disposable accessory items, including paper pulp trays, utensils, cups, beverage bases, condiments (e.g., salt and pepper, hot sauce, grated cheese, etc.), a serving ladle and a recipe book, to allow the server to season the products to taste.

BRIEF DESCRIPTION OF THE DRAWINGS

The accompanying drawings, which are hereby incorporated into and constitute a part of this specification, illustrate the preferred embodiments of the invention and, together with the description, serve to explain the principles of the invention. In the drawings wherein like reference numerals represent like parts:

FIG. 9 is a fragmentary section view of an alternative heater assembly for use in the self-heating group meal assembly of FIG. 1; and FIG. 10 is an enlarged perspective view of a spacer for use with the alternative heater assembly of FIG. 9.

DETAILED DESCRIPTION OF PREFERRED EMBODIMENTS

Figure 1:
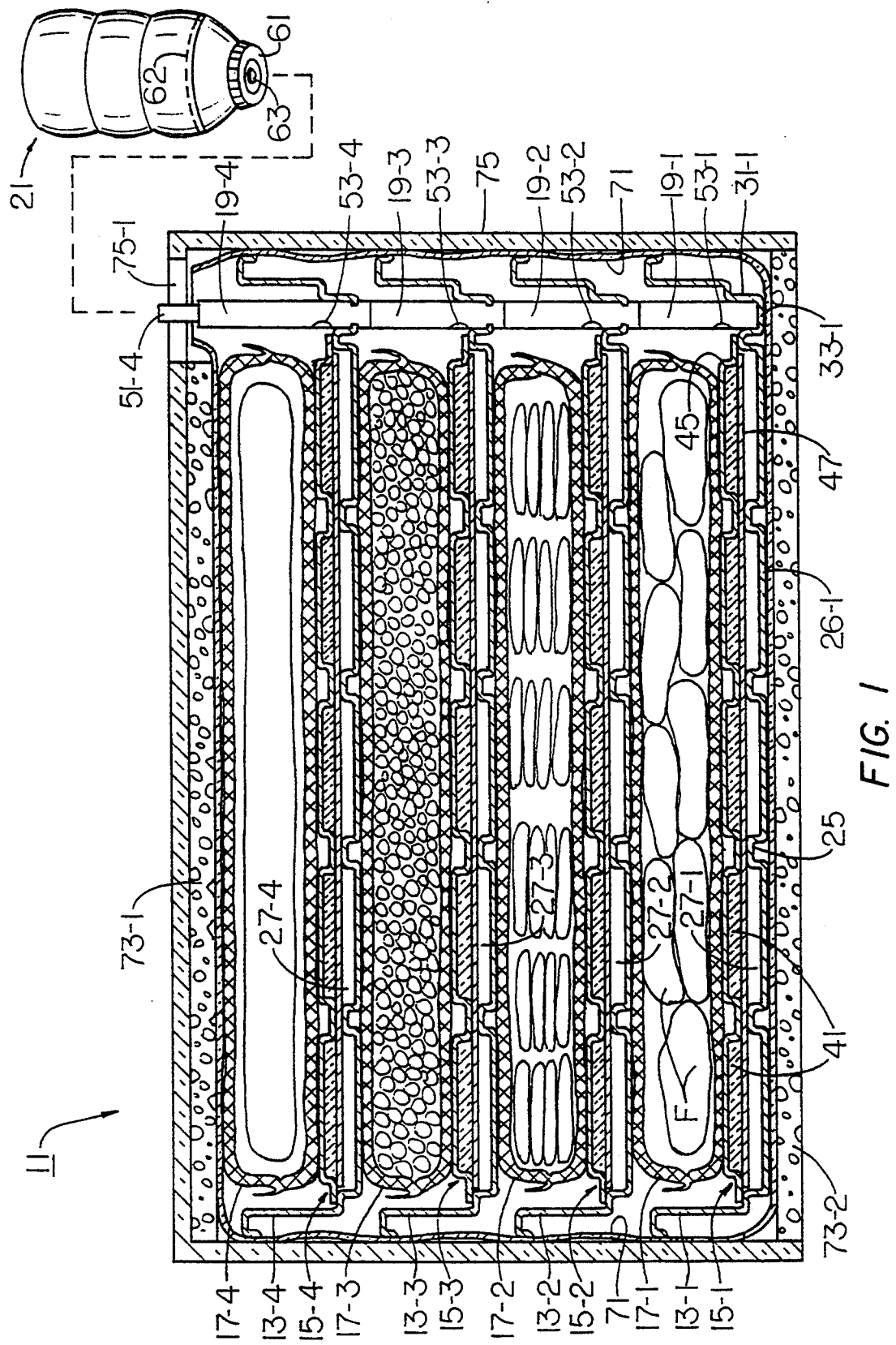
FIG. 1 is a simplified schematic section view of one embodiment of a self-heating group meal assembly constructed according to the teachings of the present invention.

Referring now to FIG. 1, there is shown a simplified schematic section view of one embodiment of a self-heating group meal assembly constructed according to the teachings of the present invention, the self-heating group meal assembly being represented generally by reference numeral 11.

Assembly 11 comprises a plurality of heating trays 13-1 through 13-4, a plurality of heater assemblies 15-1 through 15-4, a plurality of food pouches 17-1 through 17-4, a plurality of metering tube sections 19-1 through 19-4, and an activator fluid container 21.

Figure 3:
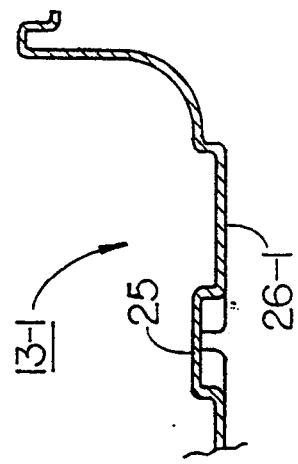
FIG. 3 is a fragmentary section view of the tray shown in FIG. 2 taken along line A—A.
Figure 4:
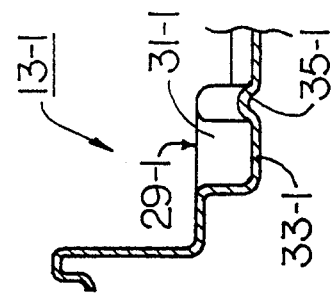
FIG. 4 is a fragmentary section view of the tray shown in FIG. 2 taken along line B—B.
Figure 2:
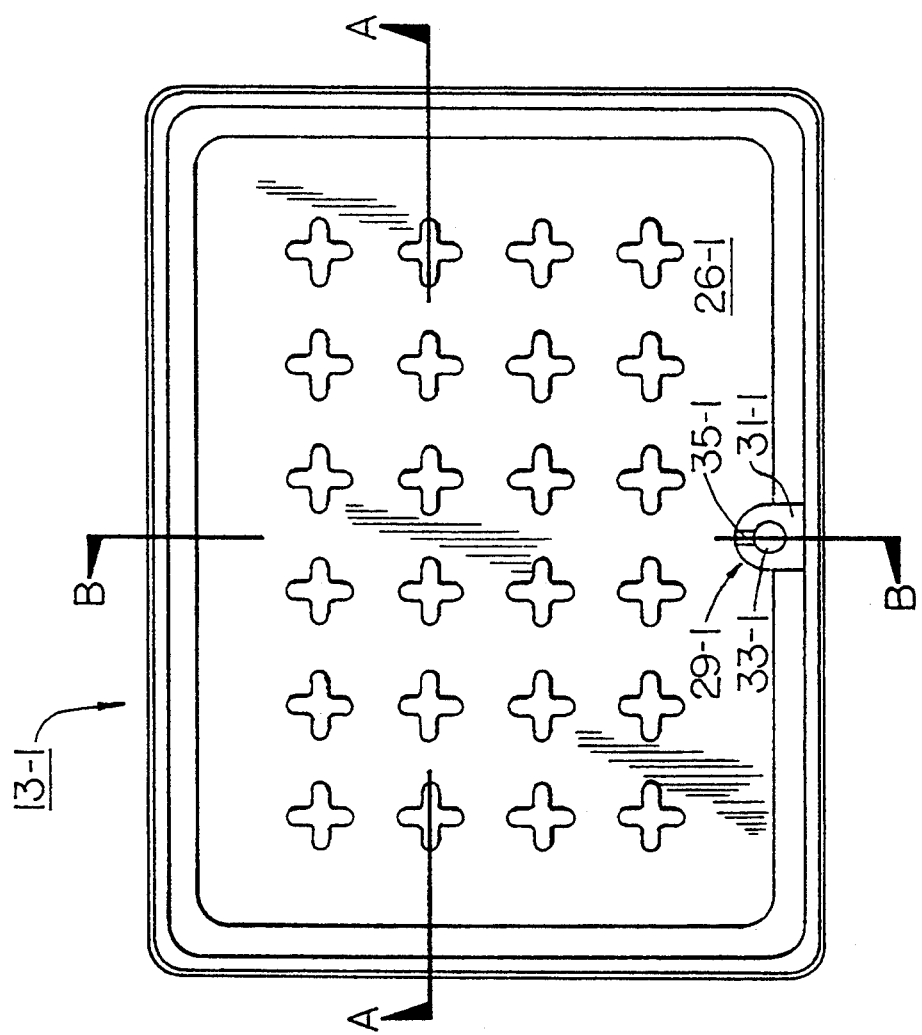
FIG. 2 is a top view of one of the trays shown in FIG. 1.

Referring now to FIGS. 2 through 4, top and various fragmentary section views, respectively, are shown of one of the plurality of heating trays 13 shown in FIG. 1, namely, heating tray 13-1. As can be seen, tray 13-1 has a plurality of integrally formed embossments or standoffs 25 extending upwardly from the bottom 26-1 of tray 13-1. Standoffs 25 serve to elevate heater assembly 15-1 relative to the bottom 26-1 of tray 13-1 so as to define a reservoir 27-1 (see FIG. 1) therebetween.

Tray 13-1 is also shaped to include an integrally formed tube holder 29-1 adapted to securely receive tube section 19-1 by a friction-fit. As seen best in FIGS. 2 and 4, tube holder 29-1 is defined by a generally circularly-shaped collar 31-1 extending upwardly from a bottom wall 33-1. Collar 31-1 is provided with a recessed area 35-1 which, as will hereinafter become apparent, is adapted to be aligned with an orifice in tube section 19-1 to permit activating solution to flow from tube section 19-1 into reservoir 27-1.

Tray 13-1 may be made, for example, from a high impact molded polymeric material (e.g., polypropylene, polyethylene, polystyrene) to which a food grade fire retardant has been added. Dimensions of tray 13-1 may be, for example, 13 inches × 10 inches × 1.5 inches, with a thickness of 0.060 inches.

Trays 13-2 through 13-4 are substantially similar in construction and composition to tray 13-1, the only difference between the respective trays being that tube holders 29-2 through 29-4 of trays 13-2 through 13-4, respectively, do not include a bottom wall. In this manner, tube sections 19-1 through 19-4 may be interconnected while mounted within their respective trays.

Figure 6:
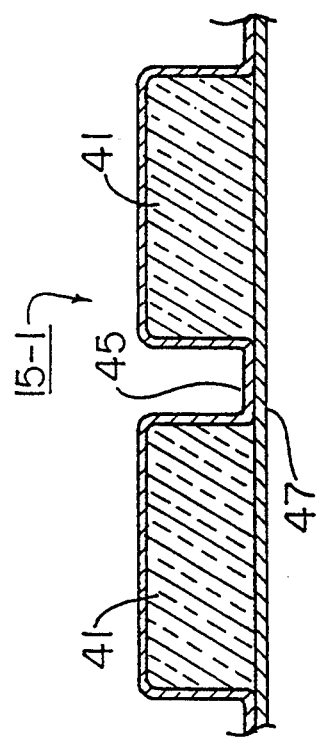
FIG. 6 is a fragmentary section view of the heater assembly shown in FIG. 5 taken along line C—C.
Figure 5:
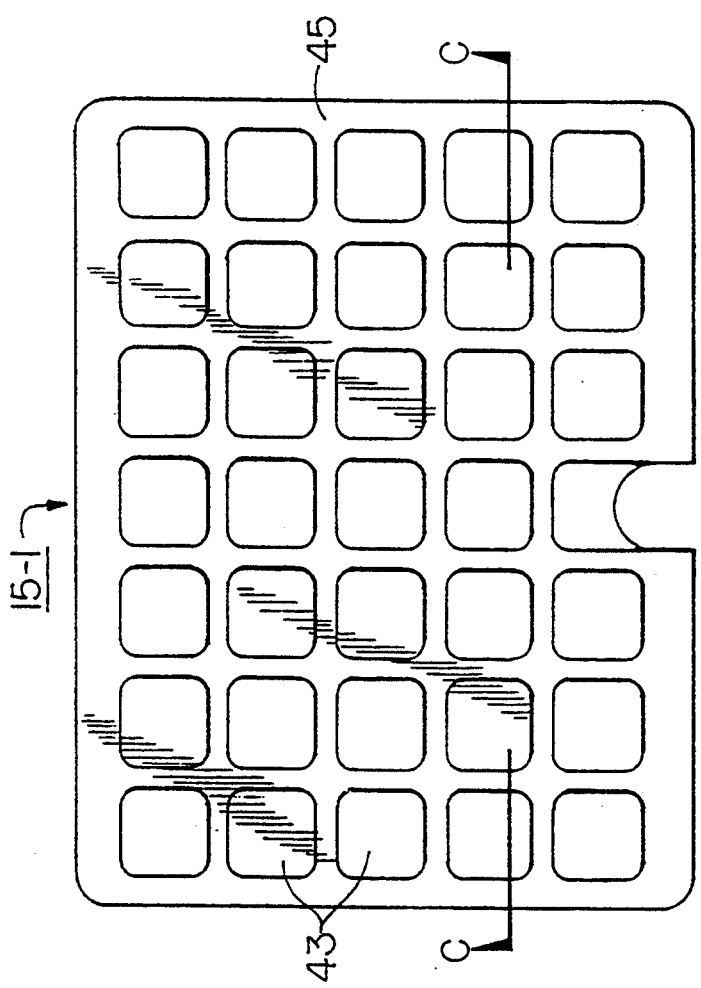
FIG. 5 is a top view of one of the heater assemblies shown in FIG. 1.

Referring now to FIGS. 5 and 6, top and fragmentary section views, respectively, are shown of one of the plurality of heater assemblies 15 shown in FIG. 1, namely, heater assembly 15-1. As can be seen, heater assembly 15-1 comprises a quantity of exothermic chemical heater material 41 consisting of a Mg-Fe alloy from which all activating materials (e.g., electrolytic salts, etc.) have been omitted. (See generally U.S. Pat. No. 4,522,190, issued Jun. 11, 1985 in the names of Kuhn et al. and U.S. Pat. No. 5,117,809, issued Jun. 2, 1992 in the names of Scaringe et al., both of which are incorporated herein by reference, for background information relating to Mg-Fe alloy heaters.) The necessary activating materials have been omitted from heater material 41 in accordance with the teachings of the present invention so that, if heater material 41 becomes accidentally immersed in water, it will not be activated. If desired, a fire retardant material may be added to the chemical heater material 41.

Heater material 41 is individually packaged inside a plurality of pockets 43 formed in a polymeric sheet 45. Each pocket 43, as well as the contents contained thereinside, is covered and sealed with a porous non-woven scrim 47 attached to the entire bottom surface of sheet 45 (by means not shown).

Polymeric sheet 45 is preferably molded from a high impact polystyrene or the like, to which a food grade fire retardant has been added. Polymeric sheet 45 may have, for example, a thickness of 0.031 inches and dimensions of 12.75 inches × 9.75 inches × 0.156, with each pocket 43 being approximately 1.38 inches by 1.38 inches. Pockets 43 are preferably spaced apart so that, when heater assembly 15-1 is placed inside tray 13-1, standoffs 25 are positioned below the space located at the intersection of each set of four adjacent pockets 43.

Heater assemblies 15-2 through 15-4 are identical in construction and composition to heater assembly 15-1.

Referring back to FIG. 1, food pouches 17-1 through 17-4 are preferably conventional retortable food pouches constructed from a known high-barrier, heat-conductive multi-laminate (i.e. plastic/metal/plastic) material. Each pouch 17 is preferably institutional-sized (12 inches × 15 inches) to hold approximately 6.6 pounds of thermostabilized food F. Alternative food containers, such as form/fill/seal pouches, polymeric trays, metal trays or half-sized institutional-size pouches, could be used in the present invention, instead of food pouches 17-1 through 17-4.

As shown in FIG. 1, the bottom of each pouch 17 is positioned directly on top of its respective heater assembly 15. In addition, the top of each pouch 17 is in direct contact with and is used to stack the tray 13 positioned over it. Consequently, in the embodiment shown, trays 13-1 through 13-4 are not directly stacked on top of one another. It should be understood, however, that such an alternative arrangement wherein trays 13-1 through 13-4 are directly stacked on top of one another could easily be achieved by upwardly extending the outer flange of each tray beyond its respective pouch and that such an arrangement is considered to fall within the scope and spirit of the present invention.

Figure 7:
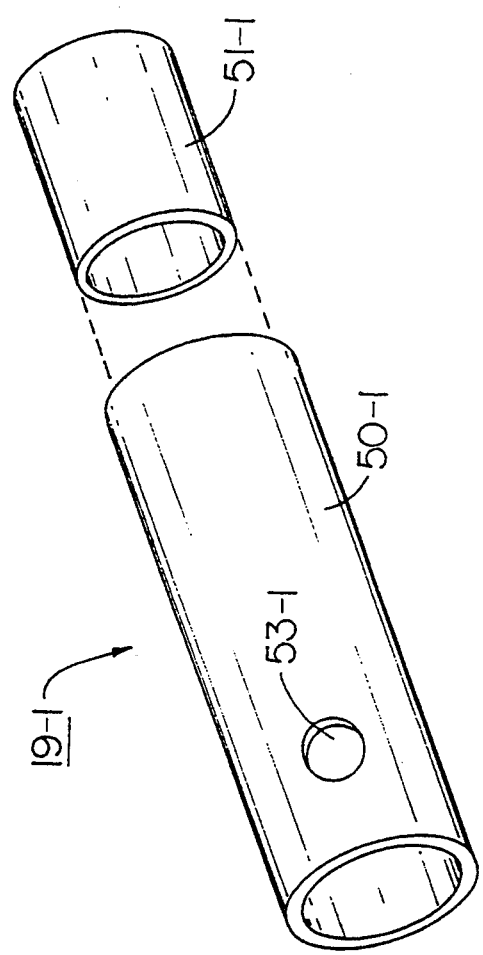
FIG. 7 is an enlarged exploded perspective view of one of the tube sections shown in FIG. 1.

Referring now to FIG. 7, there is shown an enlarged exploded perspective view of one of the plurality of tube sections 19-1 through 19-4 shown in FIG. 1, namely, tube section 19-1. As can be seen, tube section 19-1, which may be formed from molded plastic, is made up of two separate elements—a larger diameter sleeve 50-1 and a smaller diameter sleeve 51-1. Smaller diameter sleeve 51-1 is appropriately sized relative to larger diameter sleeve 50-1 so as to be insertable into one end thereof and to be retained therein by a friction-fit. To assemble tube section 19-1 from its two constituent sleeves 50-1 and 51-1, smaller diameter sleeve 51-1 is partially inserted into one end of larger diameter sleeve 50-1. To separably interconnect tube section 19-1 to a like tube section 19, the previously un-inserted portion of smaller diameter sleeve 51-1 of tube section 19-1 could be inserted into the larger diameter sleeve 50 of the second tube section 19, or the previously un-inserted portion of the smaller diameter sleeve 51 of the second tube section 19 could be inserted into larger diameter sleeve 50-1 of tube section 19-1.

As alluded to previously, larger diameter sleeve 50-1 of tube section 19-1 is provided with an orifice 53-1 alignable with recessed area 35-1 of collar 31-1 so as to permit activating fluid to flow from larger diameter sleeve 50-1 into reservoir 27-1.

If desired, tube section 19-1 and tray 13-1 may be molded as a unitary structure.

Tube sections 19-2 through 19-4 are substantially identical in construction and composition to tube section 19-1, the primary difference among the four tube sections 19-1 through 19-4 being in the sizes of the respective orifices 53-1 through 53-4. Preferably, orifices 53-1 through 53-4 are sized differently so that the same amount of water is dispensed into each reservoir 27, notwithstanding the differences in water pressure and tube capacity for each tube section.

Figure 8:
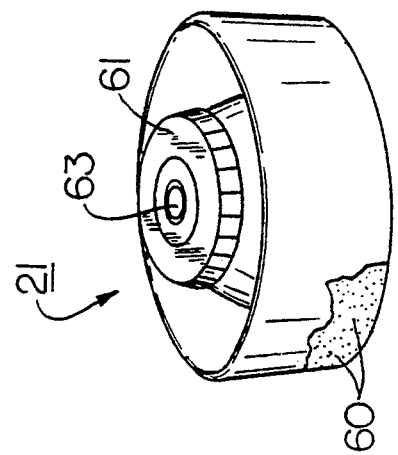
FIG. 8 is an enlarged perspective view, broken away in part, of the activator fluid container shown in FIG. 1 shown in a collapsed state.

Referring now to FIG. 8, there is shown an enlarged perspective view, broken away in part, of activator fluid container 21 shown in its collapsed state. Stored within container 21 is a mixture of dry ingredients 60, including activating electrolytes, surfactants, antifreeze and the like. Container 21 preferably has a capacity of approximately 2 quarts and has a water fill-line 62 (see FIG. 1) to aid the operator in adding the correct amount of water. Container 21 is provided with a screw-on cap 61 which may be easily removed and re-attached to permit water to be added to container 21. Cap 61 is provided with an area of weakness 63 penetrable by smaller diameter sleeve 51-4 of tube section 19-4. (If desired, the top of sleeve 51-4 may be sharpened to facilitate its insertion through cap 61.) In this manner, once water has been added to mixture 60 to form the activating solution and cap 61 has been re-attached, the solution can be easily dispensed from container 21 into tube section 19-4 by inverting container 21 and inserting section 19-4 through area 63 in cap 61.

During storage, container 21 is kept in its collapsed state, with no water added thereto.

Referring back to FIG. 1, assembly 11 can also be seen to include a plastic containment bag 71, a pair of heat-insulative pads 73-1 and 73-2, and an open-bottomed, corrugated fiberboard box 75. Bag 71, which holds trays 13 - 1 through 13 -4, heater assemblies 15-1 through 15-4, food pouches 17-1 through 17-4 and tube sections 19-1 through 19-4, serves to retain the steam which has been generated following the addition of the activating solution to heater assemblies 15-1 through 15-4.

Pads 73-1 and 73-2, which may each be a 0.5 inch thick expanded polystyrene foam pad or similar material, are positioned outside of plastic containment bag 71 on top of food container 17-4 and below tray 13-1.

All of the above-described components, except for container 21, are packaged inside box 75, which both serves to keep trays 13-1 through 13-4 properly stacked and serves as a heating compartment to retain heat in the system once heater assemblies 15-1 through 15-4 have been activated. The top of box 75 is preferably provided with a small opening 75-1 to permit attachment of container 21 to tube section 19-4 without requiring the full exposure of the remaining contents contained within box 75 to the environment. The bottom of box 75 is left open-ended so that, after the food contained inside box 75 has been properly heated, box 75 can be lifted up and removed from the stacked trays 13 and pouches 17 stored therewithin.

Assembly 11 could be packaged for transportation or storage purposes in a large corrugated or solid fiberboard shipping container (not shown) together with, for example, disposable accessory items, including paper pulp trays, utensils, cups, beverage bases, condiments (e.g., salt and pepper, hot sauce, grated cheese, etc.), a serving ladle and a recipe book, to allow the server to season the products to taste.

To use assembly 11, container 21 is expanded to its full size, cap 61 is removed therefrom, and water is added to the fill-line marked on container 21. Cap 61 is then replaced and container 21 is gently agitated (e.g., by swirling, not by shaking) until mixture 60 is completely dissolved. Container 21 is then inverted and inserted through opening 75-1 in box 75 until the top of tube section 19-4 is inserted through area 63 in cap 61, thereby allowing the activating solution to pass from container 21 into tube section 19-4. From tube section 19-4, the activating solution is then dispensed into reservoirs 27-1 through 27-4 via the respective orifices 53-1 through 53-4 formed in tube sections 19-1 through 19-4. When the activating solution is completely dispensed, it fills each of reservoirs 27-1 through 27-4, thereby causing the entirety of heater assemblies 15-1 through 15-4 to be wetted (and, consequently, activated). Container 21 is then removed from tube section 19-4, and a suitable period of time is allowed to pass for the food to be heated (e.g., approximately 30 minutes). When the heating-up period has expired, box 75 is lifted-up over trays 13-1 through 13-4. Trays 13-1 through 13-4 are then disconnected from one another by separating tube sections 19-1 through 19-4. The food pouches 17-1 through 17-4 are then opened, typically with a "U" or "X" shaped incision, and the food is served.

The above-described assembly will raise the temperature of the three lower pouches, pouches 17-1 through 17-3, approximately 100 degrees F. (e.g., 40 degrees F. to 140 degrees F.) and will raise the temperature of the upper pouch approximately 80 degrees F., all in the course of about 30 minutes. It will also keep the pouches hot for several hours in the packed configuration to allow a "heat-on-the-move" capability. Further, if opened and served at the 30 minute mark, the heater trays will continue to provide warmth during serving.

Referring now to FIG. 9, there is shown a fragmentary section view of an alternative heater assembly, instead of heater assembly 15, for use in assembly 11, the alternative heater assembly being represented generally by reference numeral 91.

Heater assembly 91 comprises a heater pad 93. Pad 93 comprises a sintered mixture of a Mg-Fe alloy from which all activating electrolytes have been omitted. Pad 93 is packaged inside a porous non-woven fabric cover 95 along with a wicking material 97, such as a paper towel, which serves to ensure that pad 93 is evenly wetted.

Because heater assembly 91 is less rigid than heater assembly 15, the placement of a food pouch 17 on top of it may cause heater assembly to block orifice 53. To alleviate this potential problem, one may use a rigid plastic spacer 101 of the type shown in FIG. 10. To use spacer 101, one merely inserts a tube section 19 through the opening 103 in spacer 101 prior to positioning heater assembly 91 on top of standoffs 25. Spacer 101 serves to keep heater 91 from blocking orifice 53 because it is sufficiently wide to bridge across the two middle columns of standoffs 25.

The embodiments of the present invention described above are intended to be merely exemplary and those skilled in the art shall be able to make numerous variations and modifications to it without departing from the spirit of the present invention. For example, the number of sets of trays 13, heater assemblies 15, food pouches 17 and tube sections 19 shown and described above as included in assembly 11 is considered to be merely illustrative and not limiting. All such variations and modifications are intended to be within the scope of the present invention as defined in the appended claims.

What is claimed is:

1. A self-heating group meal assembly comprising:
  (a) a first tray, said first tray having a first plurality of standoffs extending upwardly from the bottom thereof;
  (b) first and second heater assemblies, said first and second heater assemblies comprising (i) an exothermic chemical heater, said exothermic chemical heater comprising a Mg-Fe alloy heater from which all water soluble activating electrolytes have been omitted and (ii) packaging means for containing said exothermic chemical heater, said packaging means comprising a bottom portion made of a porous material through which an electrolyte-containing activator fluid may pass and a top portion made of a material through which heat may be conducted for heating a group-sized quantity of food positioned thereon, said first heater assembly being seated within said first tray with said bottom portion of porous material positioned on top of said first plurality of standoffs so as to define a first reservoir between said porous material and the bottom of said first tray;
  (c) a first food container for holding a group-sized quantity of food, said first food container being made of a heat-conductive material and being positioned on top of said first heater assembly;
  (d) a second tray positioned over said first food container, said second tray having a second plurality of standoffs extending upwardly from the bottom thereof;
  (e) said second heater assembly being seated within said second tray with its bottom portion of porous material positioned on top of said second plurality of standoffs so as to define a second reservoir between said porous material and the bottom of said second tray;
  (f) a second food container for holding a group-sized quantity of food, said second food container being made of a heat-conductive material and being positioned on top of said second heater assembly;
  (g) a pair of separably interconnected tube sections, the first of said pair being mounted on said first tray and having an orifice alignable with said first reservoir, the second of said pair being mounted on said second tray and having an orifice alignable with said second reservoir; and (h) a container connectable to said pair of separably interconnected tube sections, said container holding an appropriate quantity of dry activating electrolytes suitable for making an electrolyte-containing activator fluid upon the addition of water thereto.

2. The self-heating group meal assembly as claimed in claim 1 wherein said top portion of said packaging means comprises a sturdy polymeric sheet shaped to define a plurality of pockets, wherein said bottom portion of said packaging means comprises a porous non-woven scrim attached to the bottom of said polymeric sheet to seal said plurality of pockets and wherein said exothermic chemical heater is packaged inside each of said plurality of pockets.

3. The self-heating group meal assembly as claimed in claim 1 wherein said exothermic chemical heater comprises a heater pad made by sintering a mixture of polymeric powders and a Mg-Fe alloy from which all activating electrolytes have been omitted and wherein said packaging means comprises a porous non-woven fabric cover encasing said heater pad.

4. The self-heating group meal assembly as claimed in claim 3 wherein said first heater assembly further comprises a wicking material also encased within said porous non-woven fabric cover for ensuring that said heater pad becomes evenly wetted.

5. The self-heating group meal assembly as claimed in claim 3 further comprising spacer means for preventing the obstruction of said orifices in said pair of separably interconnected tube sections by said first and second heater assemblies, respectively.

6. The self-heating group meal assembly as claimed in claim 1 wherein each of said first and second food containers is an institutional-size food pouch made of a high-barrier multi-laminate material.

7. The self-heating group meal assembly as claimed in claim 1 wherein said second tray is stacked directly on top of said first food container.

8. The self-heating group meal assembly as claimed in claim 1 wherein said second tray is stacked directly on top of said first tray.

9. The self-heating group meal assembly as claimed in claim 1 wherein said activator fluid container is collapsible.

10. The self-heating group meal assembly as claimed in claim 9 wherein said activator fluid container includes a cap having an area of weakness.

11. The self-heating group meal assembly as claimed in claim 1 wherein each of said pair of separably interconnected tube sections comprises a larger diameter sleeve and a smaller diameter sleeve, said smaller diameter sleeve extending outwardly from one end of said larger diameter sleeve so that a pair of said tube sections may be separably interconnected by inserting said smaller diameter sleeve of one of said pair into the larger diameter sleeve of the other of said pair.

12. The self-heating group meal assembly as claimed in claim 1 wherein said orifices of said pair of separably interconnected tube sections are sized so that equivalent amounts of fluid will be discharged therefrom when said tube sections are interconnected in a vertically stacked arrangement and fluid is passed therethrough.

13. The self-heating group meal assembly as claimed in claim 1 further comprising:

(i) a third tray positioned over said second food container, said third tray having a third plurality of standoffs extending upwardly from the bottom thereof;

(j) third and fourth heater assemblies, said third and fourth heater assemblies comprising (i) an exothermic chemical heater, said exothermic chemical heater comprising a Mg-Fe alloy heater from which all water soluble activating electrolytes have been omitted and (ii) packaging means for containing said exothermic chemical heater, said packing means comprising a bottom portion made of a porous material through which an electrolyte-containing activator fluid may pass and a top portion made of material through which at may be conducted for heating a group-sized quantities of food positioned thereon, being seated within said third tray with its bottom portion of porous material positioned on top of said third plurality of standoffs so as to define a third reservoir between said porous material and the bottom of said third tray;

(k) a third food container for holding a group-sized quantity of food, said third food container being made of a heat-conductive material and being positioned on top of said third heater assembly;

(l) a fourth tray positioned over said third food container, said fourth tray having a fourth plurality of standoffs extending upwardly from the bottom thereof;

(m) said fourth heater assembly being seated within said fourth tray with its bottom portion of porous material positioned on top of said fourth plurality of standoffs so as to define a fourth reservoir between said porous material and the bottom of said fourth tray;

(n) a fourth food container for holding a group-sized quantity of food, said fourth food container being made of a heat-conductive material and being positioned on top of said fourth heater assembly;

(o) a third tube section separably interconnected to said second tube section, said third tube section being mounted on said third tray and having an orifice alignable with said third reservoir; and (p) a fourth tube section separably interconnected to said third tube section and directly connectable to said fluid activator container, said fourth tube section being mounted on said fourth tray and having an orifice alignable with said fourth reservoir.

14. A self-heating group meal assembly comprising:

(a) a first tray, said first tray having a plurality of standoffs formed on a bottom wall thereof;

(b) a second tray removably mounted on said first tray, said second tray having a second plurality of standoffs formed on a bottom wall thereof;

(c) first and second heater assemblies, each of said first and second heater assemblies comprising (i) an exothermic chemical heater, said exothermic chemical heater being a Mg-Fe alloy heater from which all water soluble activating electrolytes have been omitted; and (ii) packaging means for containing said exothermic chemical heater, said packaging means comprising a bottom portion of porous material through which a suitable activator fluid may pass and a top portion of heat-conductive material for heating a group-sized quantity of food positioned thereon, said first heater assembly being seated within said first tray with said porous material positioned on top of said first plurality of standoffs so as to define a first reservoir between said porous material and the bottom wall of said first tray, said second heater assembly being seated within said second tray with said porous material positioned on top of said second plurality of standoffs so as to define a second reservoir between said porous material and the bottom wall of said second tray;

(d) a pair of separably interconnected tube sections, the first of said pair being mounted on said first tray and having an orifice alignable with said first reservoir, the second of said pair being mounted on said second tray and having an orifice alignable with said second reservoir; and (e) a container connectable to said pair of separably interconnected tube sections, said container holding an appropriate quantity of dry activating electrolytes suitable for making an electrolyte-containing activator fluid upon the addition of water thereto.

15. The self-heating group meal assembly as claimed in claim 14 wherein said first tray is shaped to include a first tube holder dimensioned to securely receive said first tube section and wherein said second tray is shaped to include a second tube holder dimensioned to securely receive said second tube section.

16. The self-heating group meal assembly as claimed in claim 15 wherein said first tube section includes a bottom wall for limiting the flow of activator fluid from said first tube section.

17. A method of heating a quantity of food, said method comprising the steps of:

(a) providing an assembly comprising:
(i) a first tray, said first tray having a first plurality of standoffs formed on a bottom wall thereof;
(ii) first and second heater assemblies, said first and second assemblies comprising (i) an exothermic chemical heater, said exothermic chemical heater being a Mg-Fe alloy heater from which all water soluble activating electrolytes have been omitted and (ii) packaging means for containing said exothermic chemical heater, said packaging means comprising a bottom portion made of a porous material through which an electrolyte-containing activator fluid may pass and a top portion made of a material through heat may be conducted for heating a group-sized quantity of food positioned thereon, said first heater assembly being seated within said first tray with said bottom portion of porous material positioned on top of said first plurality of standoffs so as to define a first reservoir between said porous material and the bottom wall of said first tray;
(iii) a first food container, said first food container holding a first portion of the food to be heated, said first food container being made of a heat-conductive material and being positioned on top of said first heater assembly;
(iv) a second tray positioned over said first food container, said second tray having a second plurality of standoffs formed on a bottom wall thereof;
(v) said second heater assembly being seated within said second tray with its bottom portion of porous material positioned on top of said second plurality of standoffs so as to define a second reservoir between said porous material and the bottom wall of said second tray;
(vi) a second food container, said second food container holding a second portion of the food to be heated, said second food container being made of a heat-conductive material and being positioned on top of said second heater assembly;
(vii) a pair of separably interconnected tube sections, the first of said pair being mounted on said first tray and having an orifice alignable with said first reservoir, the second of said pair being mounted on said second tray and having an orifice alignable with said second reservoir; and
(viii) an activator fluid container connectable to said pair of separably interconnected tube sections, said activator fluid container holding an appropriate quantity of dry activating electrolytes suitable for making an electrolyte-containing activator fluid upon the addition of water thereto;

(b) then, adding an appropriate amount of water to the activating electrolytes in said activator fluid container to make an electrolyte-containing activator fluid; and (c) then, connecting said activator fluid container to said pair of separably interconnected tube sections, whereby the activator fluid flows through said pair of separably interconnected tube sections into said first and second reservoirs and comes into contact with said first and second heater assemblies, thereby activating said first and second heater assemblies.

18. The method as claimed in claim 17 further comprising the steps of:

(d) after said connecting step, allowing the food to be heated for an appropriate period of time;
(e) next, disconnecting said pair of separably interconnecting tube sections: and
(f) opening said first and second food containers.

* * * * *